United States Patent
Hossain et al.

(10) Patent No.: US 9,750,066 B2
(45) Date of Patent: Aug. 29, 2017

(54) METHOD AND A NETWORK STRUCTURE FOR PROVIDING DEVICE CONNECTIVITY TO A RADIO ACCESS NETWORK

(71) Applicant: NEC EUROPE LTD., Heidelberg (DE)

(72) Inventors: Mohammad Istiak Hossain, Stockholm (SE); Andreas Kunz, Heddesheim (DE); Konstantinos Samdanis, Dossenheim (DE); Xiaowei Zhang, Duesseldorf (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/782,792

(22) PCT Filed: Apr. 10, 2014

(86) PCT No.: PCT/EP2014/057316
§ 371 (c)(1),
(2) Date: Oct. 7, 2015

(87) PCT Pub. No.: WO2014/167073
PCT Pub. Date: Oct. 16, 2014

(65) Prior Publication Data
US 2016/0037571 A1    Feb. 4, 2016

(30) Foreign Application Priority Data

Apr. 11, 2013    (EP) .................................. 13163375

(51) Int. Cl.
*H04W 80/04* (2009.01)
*H04W 48/16* (2009.01)
(Continued)

(52) U.S. Cl.
CPC ......... *H04W 76/023* (2013.01); *H04W 4/005* (2013.01); *H04W 4/08* (2013.01);
(Continued)

(58) Field of Classification Search
CPC ... H04W 48/16; H04W 84/18; H04W 72/048; H04W 80/04
See application file for complete search history.

(56) References Cited

U.S. PATENT DOCUMENTS

| | | | |
|---|---|---|---|
| 2012/0296968 A1 | 11/2012 | Lin et al. | |
| 2013/0235732 A1* | 9/2013 | Nema | H04W 84/18 370/241 |

(Continued)

FOREIGN PATENT DOCUMENTS

| | | |
|---|---|---|
| EP | 2413621 A1 | 2/2012 |
| WO | WO 2009084051 A1 | 7/2009 |
| WO | WO 2012041363 A1 | 4/2012 |

OTHER PUBLICATIONS

3GPP TS 22.368 V12.2.0 (Mar. 2013), 3rd Generation Partnership Project; Technical Specification Group Services and System Aspects; Service requirements for Machine-Type Communications (MTC); Stage 1 (Release 12), pp. 1-24, Mar. 2013.

(Continued)

*Primary Examiner* — Andrew Lee
(74) *Attorney, Agent, or Firm* — Leydig, Voit & Mayer, Ltd.

(57) ABSTRACT

A method for providing device connectivity to a radio access network, wherein at least two devices are connectable or connected to the radio access network and wherein the at least two devices are members of a group of devices within a wireless local network, the members of the group of devices having the capability to establish a direct connection with other members of the group of devices, includes providing connection information used for a connection between a first device of the at least two devices and the radio access network to a second device of the at least two (Continued)

devices. The connection information enables the second device to connect to the radio access network.

21 Claims, 5 Drawing Sheets

(51) Int. Cl.
| | |
|---|---|
| *H04W 76/02* | (2009.01) |
| *H04W 4/00* | (2009.01) |
| *H04W 4/08* | (2009.01) |
| *H04W 48/10* | (2009.01) |
| *H04W 8/00* | (2009.01) |
| *H04W 4/02* | (2009.01) |
| *H04W 88/04* | (2009.01) |
| *H04W 84/04* | (2009.01) |

(52) U.S. Cl.
CPC .......... *H04W 8/005* (2013.01); *H04W 48/10* (2013.01); *H04W 76/022* (2013.01); *H04W 4/008* (2013.01); *H04W 4/02* (2013.01); *H04W 84/047* (2013.01); *H04W 88/04* (2013.01)

(56) References Cited

U.S. PATENT DOCUMENTS

| | | | | |
|---|---|---|---|---|
| 2014/0128057 | A1* | 5/2014 | Siomina | H04J 3/0685 455/423 |
| 2014/0293982 | A1* | 10/2014 | Gupta | H04W 48/16 370/338 |
| 2015/0031353 | A1* | 1/2015 | Hakola | H04W 48/16 455/422.1 |
| 2015/0173060 | A1* | 6/2015 | Ge | H04W 72/048 370/252 |

OTHER PUBLICATIONS

ETSI TS 123 682 V11.3.0 (Jan. 2013), Digital cellular telecommunications system (Phase2+); Universal Mobile Telecommunications System (UMTS); LTE; Architecture enhancements to facilitate communications with packet data networks and applications (3GPP TS 23.682 version 11.3.0 Release 11), pp. 1-31, Jan. 2013.

* cited by examiner

METHOD AND A NETWORK STRUCTURE FOR PROVIDING DEVICE CONNECTIVITY TO A RADIO ACCESS NETWORK

CROSS REFERENCE TO RELATED APPLICATIONS

This application is a U.S. National Stage Application under 35 U.S.C. §371 of International Application No. PCT/EP2014/057316 filed on Apr. 10, 2014, and claims benefit to European Patent Application No. EP 13163375.2 filed on Apr. 11, 2013. The International Application was published in English on Oct. 16, 2014 as WO 2014/167073 A2 under PCT Article 21(2).

FIELD

The present invention relates to a method for providing device connectivity to a radio access network to which at least two devices are connectable, said at least two devices being members of a group of devices within a wireless local network with a possibility of a direct connection between said devices; and to a network structure for providing connectivity of devices to a radio access network to which at least two devices are connectable, said at least two devices being members of a group of devices within a wireless local network with a possibility of a direct connection between said devices.

BACKGROUND

A method and an according network structure for providing connectivity of devices to a radio access network are known from prior art. There are various use cases wherein at least two devices are connectable to a radio access network and wherein said at least two devices are members of a group of devices within a wireless local network. Further, a direct connection between said devices within the wireless local network is possible.

3GPP LTE networks aim to provide broadband connectivity to multiple users enhancing the service quality. Among the different services offered by LTE, new evolving services that take advantage of the LTE ubiquitous coverage involve no human participation and hence introduce new requirements beyond the traditional ones. Such requirements are different because of the plurality of Machine Type Communication, MTC, devices and the need to transmit small data at infrequent periods. 3GPP has already specified the network architectures for supporting such MTC devices and services, while currently is exploring ways to optimize the network usage for supporting large number of MTC devices, see 3GPP TS 23.682.

In particular, it is estimated that large numbers of MTC devices are affiliated with a single MTC user. The MTC user owns a MTC Server which is allied with a number of MTC devices. This server and devices are connected through a packet switched network owned by a mobile network operator via an Access Point Name, APN, using Gi interface. Typically, if there are 'n' numbers of MTC users who own 'm' numbers of MTC devices (n×m) number of devices need to transmit small data, and for each individual transmission the radio and S1 bearer needs to be re-established when moving from ECM_IDLE to ECM_CONNECTED state per device.

Such a process can cause congestion considering the associated signaling required in combination with the high number of MTC devices, which may try to access the network almost simultaneously: (1) to attach to the network or (2) to activate/modify/deactivate a connection. Use cases are given in 3GPP TS 22.368.

When many or each device needs to send small amounts of data, then the Radio Resource Control, RRC, connection setup, radio bearer setup and S1 bearer setup generate more signaling than the size of the user data payload that has to be transmitted.

This results in a large amount of network resources necessary for the connectivity of the devices and for the communication of the devices with elements of the radio access network.

In the paper "A Group Based Communication Scheme Based on the Location Information of MTC Devices in cellular Networks," authors K. Lee and J. Shin focused on a group based communication where this scheme groups a number of connections that are triggered by closely located UEs if a certain application of the UEs triggers a number of connections to request the same user data. For an example, a number of audiences in a concert hall may try to receive a pamphlet as they enter the hall. Or like a certain bunch of closely located devices upgrading the firmware. In these cases, this group base communication is used to utilize the downlink data transmission. So this scheme is effectively providing a multicasting solution, which groups UEs based on location information that is made available to the network via complementary MTC devices.

In WIPO Patent Application WO/2012/041363, radio bearer sharing scheme for wireless machine type communication, MTC, especially for a group of MTC devices with small traffic in the same cell. A group of MTC devices served in the same cell is treated as one user equipment. An MTC device ID is used to uniquely identify such an MTC device on the MTCu interface with a base station in a cell. All the MTC devices in a group share the same radio network identifier and the MTC group identifier, and can be distinguished by the device index in the group. The base station allocates one radio bearer over the MTCu interface for the small sessions of the devices, which have similar QoS requirements (QCI parameter and Layer 2 parameters) and the same MTC server. The data transmission scheduling information is signalled from the base station to the MTC devices in the same group, which may be achieved without over the air signalling if the timing of the UL signal is linked to a corresponding DL transmission interval. Then the devices transmit data packets one by one accordingly. Within the MTCu DRB, the compressed ID is added into the PDCP PDU header to identify the packets belonging to different MTC devices. Only updates need to be communicated between the MTC devices and the base station in the case that the device members of an MTC group change.

In U.S. Patent Application Publication No. U.S. 2012/0296968, a method is proposed to group M2M devices together and to associate such groups of devices with a M2M gateway that provides connectivity towards the network and can also identify devices within the group. The proposed scheme is static, having a fixed M2M gateway. Our invention adopts the concept of M2M gateway in terms of connectivity but in our proposal M2M gateway is the one that uses the virtual bearer and can change dynamically. In addition our scheme introduces the concept of virtual bearer that can be shared by all devices in the group and also introduces security measures.

In "Towards Ubiquitous Massive Accesses in 3GPP Machine-to-Machine Communications," published in IEEE Communications Magazine, Vol. 49, No. 4, April 2011, authors S-Y. Lien, K-C. Chen, and Y. Lin describe prior M2M grouping methods focusing on efficient radio resource management, grouping M2M Devices according to their QoS requirements. Their purpose is to organize M2M Devices into QoS-specific groups based on expected packet arrival rates and maximum tolerable delays to be capable to estimate and schedule radio resource accordingly with the objective to allocate adequate resource for M2M services without disturbing other applications.

SUMMARY

In an embodiment, the present invention provides a method for providing device connectivity to a radio access network, wherein at least two devices are connectable or connected to the radio access network and wherein the at least two devices are members of a group of devices within a wireless local network, a direct connection being establishable between the devices. The method includes providing, for a second device of the at least two devices, connection information useable for a connection between a first device of the at least two devices and the radio access network so that the second device is enabled to connect to the radio access network based on the connection information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention improves and further develops a method and a network structure for providing device connectivity to a radio access network for allowing a resource and energy efficient connectivity and communication of devices to and with the radio access network.

In an embodiment, a method is provided in which connection information used for a connection between a first device of at least two devices and a radio access network is provided for a second device of at least two devices, so that the second device is enabled to connect to the radio access network based on said connection information.

In an embodiment, a network structure is provided in which a communication device for providing connection information used for a connection between a first device of at least two devices and the radio access network for a second device of at least two devices, so that the second device is enabled to connect to the radio access network based on said connection information.

According to an embodiment of the invention, it has been recognized that for allowing a very resource and energy efficient behavior a connection information of a first device can also be used for a second device, if said connection information is provided for the second device in a suitable way. Thus, connection information which has been used for a connection between a first device and the radio access network can at least partially be used for a second device, so that the second device is enabled to connect to the radio access network based on said connection information. This has the advantage that for example a bearer needs not to be re-established for each individual data transmission between a device and the radio access network or an element of the radio access network. The generation of for example a RRC connection setup, radio bearer setup and S1 bearer setup is not necessary for each individual data transmission of sometimes only small user data payload that has to be transmitted. The signaling process and/or bearer re-establishment procedures can be reduced by the inventive method and network structure.

Thus, a resource and energy efficient connectivity and communication of devices to and with the radio access network is allowed.

Within a preferred embodiment the connection information can comprise at least one connection parameter and/or at least one bearer parameter and/or at least one radio bearer parameter. Thus, the connection information can comprise various parts which can provide for connection between different elements of the radio access network.

With regard to an efficient method the connection information can be provided for the second device, if a data transmission from the first device to the radio access network or vice versa is finished or if there is a data transmission pause of a definable length. As soon as the first device can be inactive, as all necessary data has been transmitted to a target element, the connection information can be provided for the second device, as the first device does no longer need the connection. Depending on an individual situation a data transmission pause can be defined, when the provision of the connection information to another device seems to be necessary.

Within a concrete preferred embodiment the connection information can be moved or transmitted from said first device to said second device and/or activated within said second device. A movement of the connection information from said first device to said second device is a very simple proceeding within the inventive method. The connection information can be activated within said second device, if the connection information has reached the second device in any way. Within a preferred embodiment the connection information can be stored within a virtual device. Particularly in this case, the connection information can be retrieved or transmitted from the virtual device to the second device directly. In this case, also the first device could have received a connection information from the virtual device at first.

For performing the necessary steps regarding connectivity and/or data transmission, the virtual device can run on any hardware device without any requirements on the hardware or on the hardware of the first device or of the second device. Thus, no special hardware has to be provided for the virtual device. This simplifies the method and network structure of the present invention.

Within a further preferred embodiment the virtual device can be a functionality which can be moved between or activated within said devices that belong to said group. Such a virtual functionality is in line with actual virtual network structures and can be implemented easily within present network structures.

Within a further preferred embodiment the virtual device can be linked to a specific radio bearer or bearer that can be shared by different devices. This is a simple realisation of the inventive method with the possibility of reusing a bearer.

For providing a very reliable data transmission between devices and elements of the radio access network only one of the first and second devices can be or is active at one point in time. There could be provided specific measures for avoiding that more than one device uses the connection information at the same time.

Depending on individual circumstances and situations there can be members of the group, i.e. devices, which are not directly connectable to the radio access network due to reduced or not present network radio coverage. Thus, one or more of the devices of the group are not connectable or connected directly to the radio access network. Particularly in this case the connection of such devices can be provided by other devices which are directly connectable to the radio access network and which are also in connection with the device or devices which are not directly connectable to the radio access network. Thus, within a preferred embodiment said first or second device being directly connected to the radio access network can have the functionality of a Master Device or Master Machine or Master Gateway for assisting other devices of the group which are not connectable or connected directly to the radio access network in gaining access or a connection to the radio access network. Such an embodiment can provide connectivity for devices that have no direct access to the radio access network compensating for poor network planning.

Within a further preferred embodiment said first or second device being directly connected to the radio access network can broadcast or announce a group ID via the wireless local network to other devices. Such a group ID can identify devices regarding an access to the radio access network for providing a very simple access to the radio access network.

The generation or definition of the group of devices depends on individual situations and parameters. Within a preferred embodiment the group can be formed on the basis of geographical information, a service requirement and/or a potential load limit. However, other parameters can be important for generating or defining the group. A characterizing feature of the group can be the possibility of a direct connection between all group members, i.e. devices.

Preferably, at least one of said devices can be a Machine Type Communication, MTC, device. Further preferred, all devices are MTC devices which can communicate with each other.

Within a concrete embodiment the wireless local network is an ad-hoc network, WLAN network or Bluetooth network. The radio access network can be preferably a LTE network. Generally, said at least two devices can be connectable to a radio access network via an access point. Such an access point can be an eNodeB, eNB.

After a movement or switch of the connection information the first device's prior connection between the access point and at least one further functional element of the radio access network can be maintained. Thus, a prior connection can be partially or fully maintained beginning from the access point in the direction of elements of the radio access network or further elements which are connectable to the radio access network. Such an at least one further functional element of the radio access network can be a Serving Gateway, SGW.

Based on the present invention it is possible to minimize the Mobility Management Entity, MME, NAS signalling and the S1 and radio bearer re-establishment procedures.

Embodiments of the present invention can address a number of important advancements and challenges. Such advancements and challenges can include providing efficient bearer management for small data transmission, reducing potential congestion, providing connectivity for MTC devices that have no direct macro cellular access compensating for poor network planning, and introducing a security method at master gateway, i.e. the MTC device that assists other devices with no macro cellular connectivity to gain access, can authorize other MTC devices to gain macro cellular access.

Embodiments of the present invention further include a number of important aspects. A method and system according to an embodiment of the invention can provide embodiments where two or more devices use the same radio access network and where the radio bearer/connection parameters from one device to the network can be used by another device. The method and system according to an embodiment of the invention can include transferring state information from one device to another device, where the state information can be stored in a virtual device. The virtual device can run on the hardware of the host device, e.g. could be an application running on the host device. The virtual device can be the functionality that can be moved or activated within other host devices that belong to the same group. The virtual device is linked to a specific radio bearer that can be shared by different devices. A special group bearer can be shared by devices within the group that have connectivity and the capability, in a way that only the active device can decode the signal of the downlink shared channel. In some implementations, only one device can be active at one point in time. Connectivity support of devices without direct macro-cellular network connectivity using alternatively ad hoc technology via the virtual device can also be provided.

Embodiments of the present invention can also provide the following advantages:

Efficient bearer management/sharing for supporting small data infrequent transmissions of a group of MTC devices.

Enable connectivity of the devices without macro cellular connectivity.

Coordination between master gateways and devices without direct macro-cellular connectivity regarding group bearer utilization, optionally providing smart schemes for battery consumption balancing of those devices.

Bearer configuration transmission/parameter via the wireless ad hoc network between the master gateways.

Further advantages can include: saving configuration signaling for bearer management over the cellular network, e.g. NAS messages such as service request, radio bearer setup, S1 bearer setup, RACH; moving the MVM between devices with coverage enables the MME to provide smart schemes for battery consumption balancing of those devices; extension of coverage via wireless ad-hoc technology.

An embodiment of the present invention exploits the use of two diverse means of device connectivity based on: (i) a wireless Ad-Hoc network, device-to-device, e.g. WLAN, ZigBee, Bluetooth, LTE direct etc., which connects devices directly and (ii) a wireless network with macro coverage, e.g. 3GPP GERAN/UTRAN/E-UTRAN or 3GPP2 or IEEE 802.xy networks that provide Internet and core network access to devices within the access point range. Embodiments of the present invention explore the connectivity potential of both access technologies with the aim of improving the conventional bearer management scheme, introducing a virtual bearer, utilizing Network Function Virtualization, NFV, technology while enhancing coverage. Some devices within the coverage of a particular cell of an Access Point have sufficient while other have very poor or no coverage. Hence the present proposal optionally can provide a coverage solution under poor coverage conditions.

It is envisioned that the devices within the coverage of a cell may be connected to each other automatically/directly via the wireless Ad-Hoc network technology. The devices within the vicinity of the access point that receive good coverage may attach to the wireless network via the access point directly. Once such devices attach to the network, the Management Entity, e.g. MME in 3GPP networks, of the wireless network should provide a Group ID that associates each attached device to a particular predetermined group, which may be formed combining device location, Quality of Service, QoS, or other device service requirements. The way that groups are formed could be based on geographical information, service requirements, i.e. same QoS-bearer requirements, and on potential load limits, i.e. how much load it can be scheduled from a particular device set. The devices attached to the macro cellular network directly, then broadcast/announce the Group ID via the wireless Ad-Hoc network to devices without or with poor coverage that cannot attach to the wireless network directly. It should be noted, that the present invention focuses on a single hop transmission within the Ad-Hoc part and is not considering multi-hopping, i.e. more than two Ad-Hoc hops.

Figure 1:
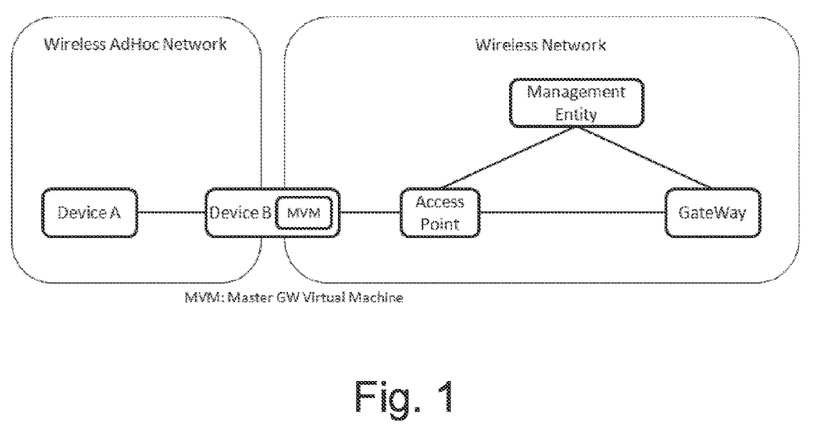
FIG. 1 illustrates an embodiment of a network structure of the present invention.

When a macro cellular directly attached device needs to transmit data or when an Ad-Hoc network connected device needs to transmit data via the macro cellular attached device, the device may use the Group ID as identity to obtain access. The Management Entity can identify the Group ID and initiates the corresponding resource reservation, which accommodates the desired QoS from the Gateway to the device. The device that has direct macro cellular access configures itself as a Master GW, which can serve other devices connected via the wireless Ad-Hoc network and announces its capability in the wireless Ad-Hoc network. It should be noted that there may be only one device configured as a Master GW within one group. FIG. 1 provides an overview of the system described pointing out the major elements and their relation.

The Master GW may use a dedicated IP address for the communication and provides address/port number translation for the devices connected via the wireless Ad-Hoc network. The master device also is the one that uses the virtual bearer via an enabling mechanism that can shift bearer from one device to another, either by triggering certain preconfigured parameters or by copying the "bearer state". Once the Master GW has no further data to transmit, it will announce that it can give away its Master GW configuration. Other directly attached devices to the wireless network can request this capability from the current Master GW, which then shares/shifts the full configuration of the radio and network parameters to the new device. With that there is no need for further signaling to the wireless network.

The re-usage of the bearer assigned to the group minimizes the signaling for requesting resource allocation over the air interface of the wireless network and within the core network of the wireless network. Since the proposed scheme targets small data the time dedicated to each transmission is relatively short, hence the grouping phase bundles devices together in such a way to avoid introducing major transmission delays for other devices.

Figure 2:
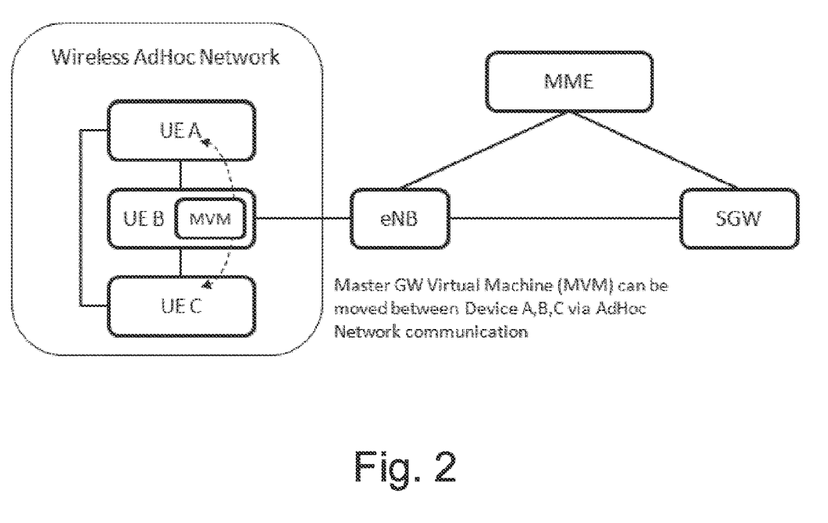
FIG. 2 illustrates an embodiment of a network structure according to the invention.

It is envisioned as another embodiment of the proposed scheme the use of the 3GPP mobile network as wireless network and 802.11 Wireless LAN as Ad-Hoc technology between the UEs or devices. Generally, it has to be noted that within this document the term "User Equipment, UE" is used synonymously with the term "device". The following describes in more detail how an E-UTRAN/EPC variant would be realized, but of course it is not limited to and would work also with other wireless network technologies, such as e.g. GERAN/UTRAN or 3GPP2 or IEEE 802.xy networks. A Radio, S1 and S5/S8 bearer is shared among a specific device group for the communication among the attached UE group members within one cell, where only one UE of the group—Master GW Virtual Machine, MVM—can receive transmit at one point in time. All group members UEs are located in the same cell or within the vicinity of UEs that reside in the same cell, as shown in FIG. 2.

As a basic assumption all UEs that belong to a group are belonging to the same subscription and the group is preconfigured in the Home Subscriber Server, HSS, or dynamically assembled based on e.g. cell ID, location, subscription information etc. This information is then downloaded to the MME e.g. at time of Attach with the subscription information. The MME may also provide a list for the sequence/pattern how the MVM is moved between and which UEs.

The MVM is acting as a virtual UE, reusing the hardware of the host UE. The MVM is the functionality that can be moved or activated within other UEs that belong to the same group. The MVM contains all relevant information or connection information about the relevant protocol states like radio, RRC, PDCP state etc., including information like RNTI, group keys, group IMSI, group TMSI, Group IP address etc. After moving the MVM to another UE, the UE may inform the eNB and the eNB may change the group RNTI or other information so that only the UE hosting the MVM is able to decode the Downlink Control Information, DCI Timing advance may need to be readjusted when transferring the MVM to another UE due to the different geographic location and the resulting effects on the air interface.

Downlink data is DCI masked with RNTI, only the MVM can read the DCI and can do mapping of downlink packets to the respective UE connected via the Ad-Hoc network. Optionally the MVM could also instruct the respective UE to listen to the DCI with the group RNTI to read the data directly.

Figure 3:
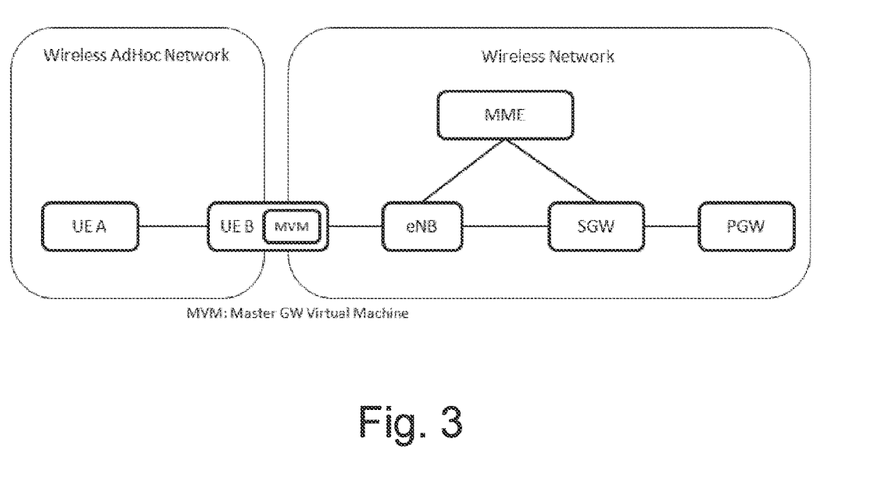
FIG. 3 illustrates an embodiment of a network structure according to the invention.

UEs in the vicinity of the wireless Ad-Hoc network may connect to each other directly by using a second interface via the Ad-hoc networking, e.g. WLAN, ZigBee, Bluetooth, LTE direct etc., shown in FIG. 2 and FIG. 3 respectively. All UEs that are under LTE coverage will initially attach to the network. The MME may select one UE and sends corresponding Group information relevant for setting up the MVM, e.g. Group IMSI, Group Key, Group TMSI, etc., and for the group identification from the network, e.g. MME, HSS. Optionally the MME may send the group information to all UEs in the same group which are attaching to the network.

Only UEs with LTE coverage can configure themselves with the MVM, since they are the only ones to provide backhaul connectivity for the UEs without LTE coverage connected via the Ad-Hoc network. The UE that may be hosting the MVM would be preferably one with low mobility or simply being static. For sharing the radio bearer, not the same security context is used by the UEs instead the same group key allocated to the UEs who are authorized to join the group. All other devices without LTE Access are clients of the UE hosting the MVM. It is assumed that the communication between MVM and UEs without LTE coverage is secured by means of the wireless Ad-Hoc technology. UE A in FIG. 3 has no LTE coverage, wherein UE B has LTE coverage.

Figure 4:
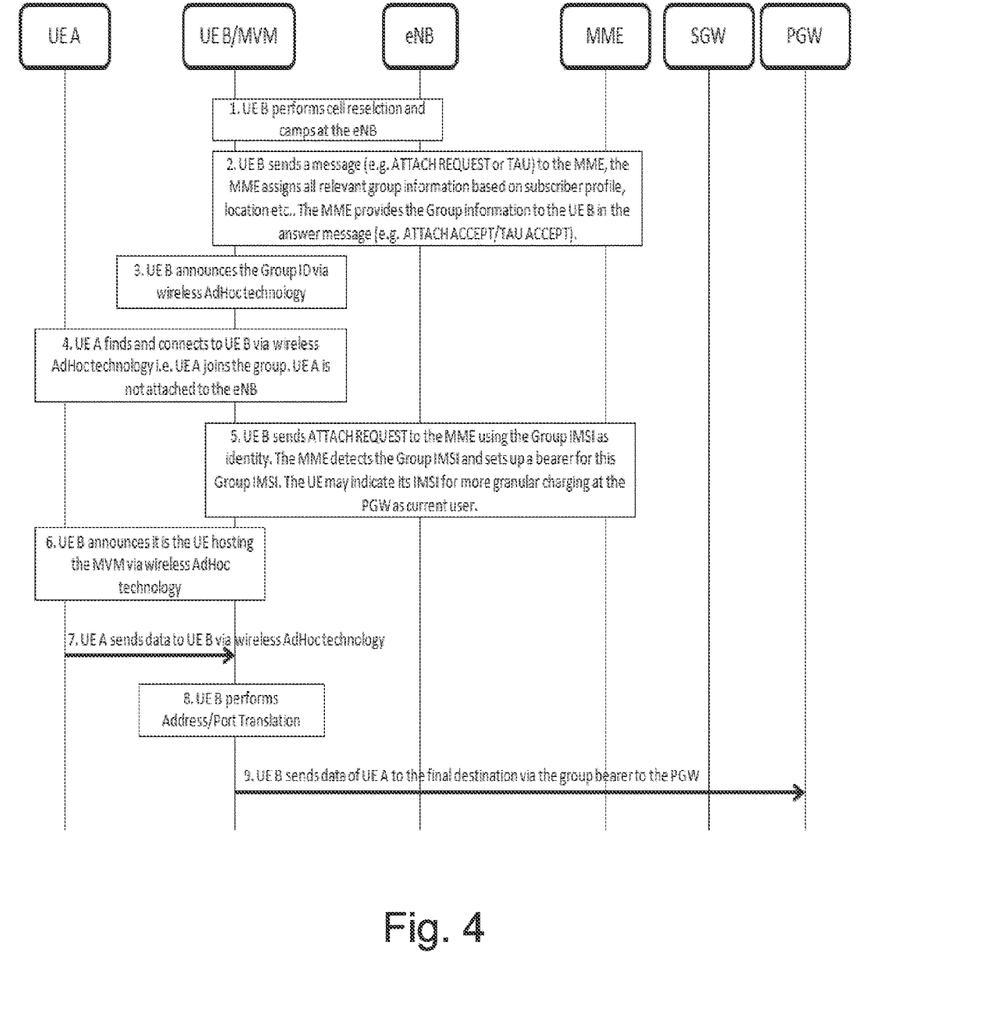
FIG. 4 illustrates a call flow of an embodiment of a method according to the invention.

FIG. 4 shows the call flow for providing connectivity to group members without LTE coverage via the UE hosting the MVM:

1. UE B performs cell reselection and camps on the eNB.
2. UE B sends a message, e.g. ATTACH REQUEST or Tracking Area Update, TAU—in case it is already attached, and moved into a new cell—to the MME, the MME assembles the Group Information—e.g. Group IMSI, Group ID, Group Key, Group TMSI, etc. based on subscriber profile, location etc. The MME provides the Group Information to the UE B in the answer message, e.g. ATTACH ACCEPT/TAU ACCEPT. The MME may also provide a list for the sequence/pattern how the MVM is moved between and which UEs.
3. UE B configures the MVM and announces/broadcasts the Group ID via wireless Ad-Hoc technology. UEs without LTE coverage but within the vicinity of the Ad-Hoc network could learn in this way the Group ID. UEs without LTE coverage can potentially belong to several groups, only UEs with LTE coverage can preferably belong to only one group, indicated in the ATTACH_ACCEPT by the MME. Step 3 and 4 could be also executed after the ATTACH of the MVM with step 6.
4. UE A finds and connects to UE B via wireless Ad-Hoc technology, i.e. UE A joins the group instead of being directly attached to the eNB.
5. The MVM of UE B sends an ATTACH REQUEST to the MME using the Group IMSI as identity. The MME detects the Group IMSI and checks whether no other host UE is currently attached using the Group IMSI, else it rejects the request. The MME sets up a bearer for this Group IMSI. The PGW assigns an IP address for the Group IMSI. The UE may indicate its identity, e.g. IMSI for more granular charging at the PGW as current user.
6. UE B announces that it is the UE hosting the MVM via wireless Ad-Hoc technology, so that all members in the group know the state of the token and the particular device that currently transmits/receives data via the group bearers.
7. UE A sends data to UE B via wireless Ad-Hoc technology; it could also send a request for sending data first at this point. UE A may include its identity, e.g. IMSI, IMEI, ICSI etc.
8. UE B performs Address/Port Translation for UE A. UE B may collect charging records for the UE A and provide them to the application server before releasing the token.
9. UE B sends data of UE A to the final destination via the group bearer to the PGW. UE B may include its own identity as well as the identity received from UE A for more granular charging or policy control at the PGW.

The UE B could also wait until it received a preconfigured amount of data or even start the Group ATTACH until a certain amount of data is reached.

The UE hosting the MVM may distribute the EPS bearer context security, SRB, DRB, EEA0, APN, IP address information etc. to all the group members via the Ad-Hoc network and may generate a token for the usage of the Group Bearers. The token may be signed by the UE hosting the MVM so that the MME can recognize that the next UE hosting the MVM received the token from the current one. Then the UE hosting the MVM transmits its own data first before it may pass the token to other UEs that need to transmit data.

Figure 5:
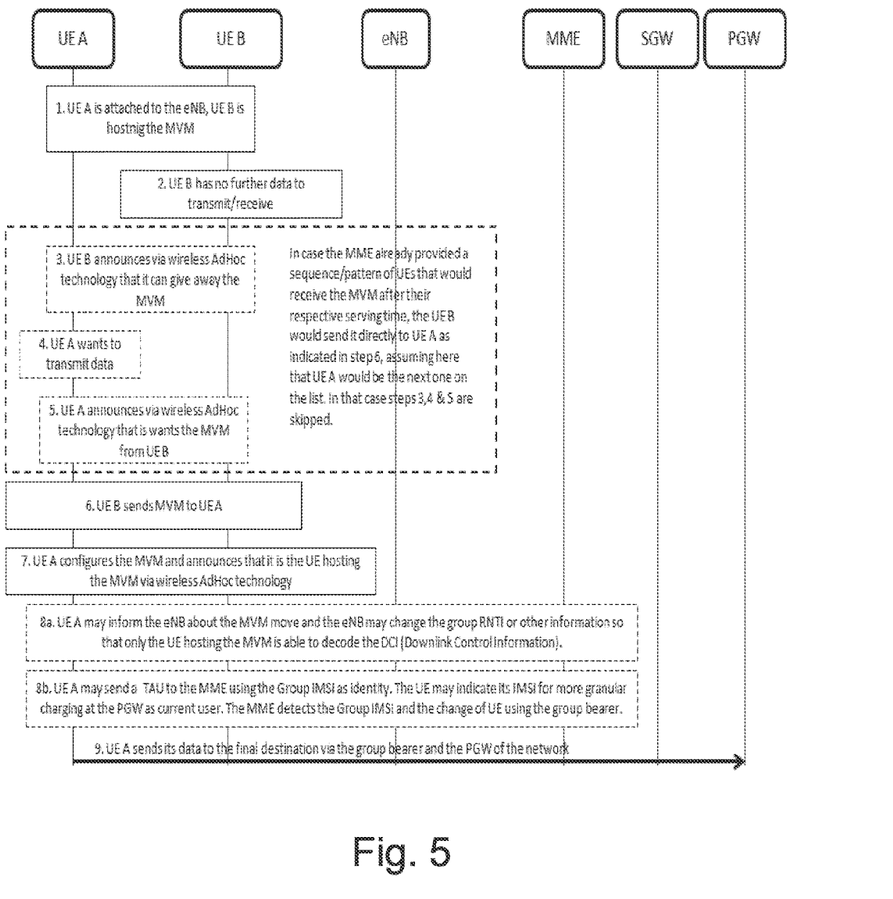
FIG. 5 illustrates a call flow of an embodiment of a method according to the invention.

FIG. 5 shows how the MVM configuration is transferred from one UE to another one:

1. UE A is attached to the eNB and authenticated to the network, UE B is hosting the MVM.
2. UE B has no further data to transmit/receive. In case the MME already provided a sequence/pattern of UEs that would receive the MVM after their respective serving time, the UE B would send it directly to UE A as indicated in step 6, assuming here that UE A would be the next one on the list. In that case steps 3, 4 & 5 are skipped.
3. UE B announces via the wireless Ad-Hoc technology that it can give away the MVM, i.e. it can release the token to another UE.
4. UE A wants to transmit data.
5. UE A announces via wireless Ad-Hoc technology that is wants the MVM from UE B, i.e. UE A requests the token from UE B.
6. UE B sends MVM to UE A, consisting of EPS bearer context—security—, SRB, DRB, EEA0, APN, IP address information, PDCP state, RRC state etc. This information may be signed by the UE B so that the MME can see that the UE A received the token correctly from the current UE hosting the MVM.
7. UE A configures the MVM and announces that it is UE hosting the MVM via wireless Ad-Hoc technology, so that UEs without LTE coverage know that UE A is the new contact point for sending/receiving data.
8. There are two options that may be executed:
   a. UE A may inform the eNB about the MVM move and the eNB may change the group RNTI or other information so that only the UE hosting the MVM is able to decode the DCI.
   b. UE A may send a TAU to the MME using the Group ID as identity and it may include the signature of the UE B to let the MME know that it received the token from UE B. The UE A may indicate its IMSI for more granular charging at the PGW as current user. The MME detects the Group ID and the change of UE that is using the group bearer.
9. UE A sends its data to the final destination via the group bearer and the PGW of the network.

If there is no data to transmit and no other UE is requesting the MVM, then the eNB will release the radio and S1 bearer, e.g. after a timer expired. The current UE hosting the MVM recognizes that the Group bearer is sent to idle mode and announces this via the Ad-Hoc network. This means that the next UE within LTE coverage has to perform a Service Request to activate the Group Radio Bearer and S1 bearer again. The parameters on the radio and S1 side may change and would have to be announced again latest when the UE does not want to transmit any data anymore.

Figure 6:
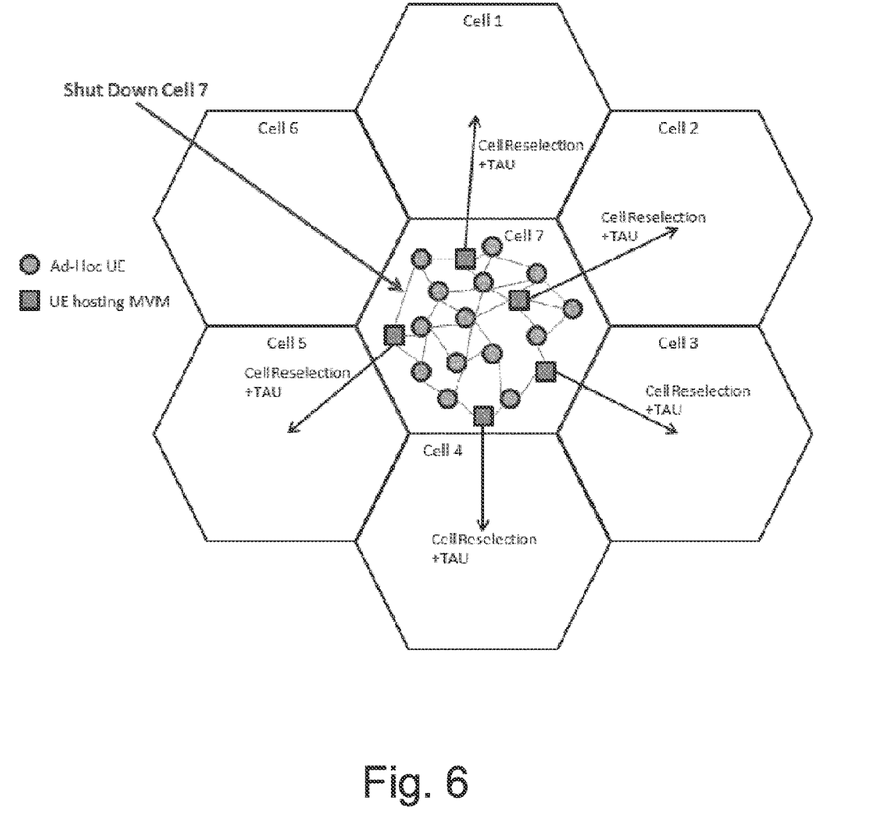
FIG. 6 illustrates a use case of energy saving of macro cells according to an embodiment of the invention.

FIG. 6 depicts a use case of energy saving of macro cells, i.e. switching off macro cells in times of low premium traffic, e.g. at night.

In this scenario, the cell 7 is populated by a huge number of machine to machine, M2M, devices like sensors etc. that need to communicate to a server frequently. In order to provide the required coverage, the above described method is used. For power saving reasons, the MME provides a smart pattern of moving the MVM between the devices at the cell border that still have coverage of the same eNB.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing connectivity between each of at least two devices and a radio access network, wherein the at least two devices are members of a group of devices within a wireless local network capable of establishing direct connections with one another, the method comprising:
   establishing a connection directly between a first device of the at least two devices and the radio access network, wherein the connection directly between the first device and the radio access network utilizes connection information provided by the radio access network to the first device; and
   establishing a connection directly between a second device of the at least two devices and the radio access network using the connection information provided by the radio access network to the first device.

2. The method according to claim 1, wherein the connection information provided by the radio access network to the first device comprises at least one of a connection parameter, a bearer parameter, or a radio bearer parameter.

3. The method according to claim 1, wherein establishing the connection directly between the second device and the radio access network is performed based on at least one of finishing a data transmission between the first device and the radio access network or a data transmission pause of a predetermined length.

4. The method according to claim 1, wherein the connection information provided by the radio access network to the first device is at least one of moved or transmitted from the first device to the second device or is activated within the second device.

5. The method according to claim 1, further comprising storing the connection information provided by the radio access network to the first device within a virtual device.

6. The method according to claim 5, wherein the virtual device runs on at least one of hardware of the first device or hardware of the second device.

7. The method according to claim 5, wherein the virtual device is a functionality which can be at least one of moved between or activated within the members of the group of devices within the wireless local network.

8. The method according to claim 5, wherein the virtual device is linked to a specific radio bearer provided by the radio access network to the first device or to a bearer provided by the radio access network to the first device that can be shared by different devices.

9. The method according to claim 1, wherein only one of the first device and the second device can be or is active at one point in time.

10. The method according to claim 1, wherein one or more of the members of the group of devices within the wireless local network are at least one of not connectable or not connected directly to the radio access network.

11. The method according to claim 10, wherein one of the first device or the second device is directly connected to the radio access network and has the functionality of a Master Device or Master Machine or Master Gateway for assisting the one or more members of the group of devices within the wireless local network which are not connectable or connected directly to the radio access network to gain access or a connection to the radio access network.

12. The method according to claim 1, further comprising:
   broadcasting or announcing, by at least one of the first device or the second device, a group ID to other members of the group of devices via the wireless local network.

13. The method according to claim 1, wherein the group of devices is formed on the basis of one or more of geographical information, a service requirement, or a potential load limit.

14. The method according to claim 1, wherein at least one of the members of the group of devices is a Machine Type Communication (MTC) device.

15. The method according to claim 1, wherein the wireless local network is at least one of an ad-hoc network, a WLAN network, or a Bluetooth network.

16. The method according to claim 1, wherein the radio access network is an LTE network.

17. The method according to claim 1, wherein the at least two devices are connectable to the radio access network via an access point.

18. The method according to claim 17, wherein the access point is an eNodeB (eNB).

19. The method according to claim 17, wherein a prior connection of the first device between the access point and at least one further functional element of the radio access network is maintained.

20. The method according to claim 19, wherein the at least one further functional element of the radio access network is a Serving Gateway (SGW).

21. A network structure for establishing connectivity between each of at least two devices and a radio access network, wherein the at least two devices are members of a group of devices within a wireless local network capable of establishing direct connections with one another, the network structure comprising:
- a first device configured to establish a connection directly with a radio access network wherein the connection directly between the first device and the radio access network utilizes connection information provided by the radio access network to the first device; and
- a second device configured to establish a connection directly with the radio access network using the connection information provided by the radio access network to the first device.

\* \* \* \* \*